(12) United States Patent
Olson et al.

(10) Patent No.: US 7,893,988 B2
(45) Date of Patent: **\*Feb. 22, 2011**

(54) METHOD FOR PRE-FOCUS OF DIGITAL SLIDES

(75) Inventors: Allen Olson, San Diego, CA (US); Greg Crandall, Rancho Santa Fe, CA (US); Dirk G. Soenksen, Carlsbad, CA (US)

(73) Assignee: Aperio Technologies, Inc., Vista, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/423,571

(22) Filed: Apr. 14, 2009

(65) Prior Publication Data

US 2010/0027856 A1 Feb. 4, 2010

Related U.S. Application Data

(63) Continuation of application No. 10/827,207, filed on Apr. 16, 2004, now Pat. No. 7,518,652, which is a continuation-in-part of application No. 10/798,457, filed on Mar. 11, 2004, now Pat. No. 6,917,696, which is a continuation of application No. 09/563,437, filed on May 3, 2000, now Pat. No. 6,711,283.

(60) Provisional application No. 60/463,909, filed on Apr. 17, 2003.

(51) Int. Cl.
*H04N 5/232* (2006.01)
*G06K 9/00* (2006.01)

(52) U.S. Cl. .................. 348/351; 348/79; 348/353; 382/133

(58) Field of Classification Search .............. 348/79, 348/80, 349
See application file for complete search history.

(56) References Cited

U.S. PATENT DOCUMENTS

| | | |
|---|---|---|
| 3,643,015 A | 2/1972 | Davidovits et al. |
| 4,672,559 A | 6/1987 | Jansson |
| 4,673,988 A | 6/1987 | Jansson et al. |
| 4,700,298 A | 10/1987 | Palcic et al. |
| 4,742,558 A | 5/1988 | Ishibashi et al. |
| 4,744,642 A | 5/1988 | Yoshinaga et al. |
| 4,760,385 A | 7/1988 | Jansson et al. |
| 4,777,525 A | 10/1988 | Preston et al. |

(Continued)

FOREIGN PATENT DOCUMENTS

CA    2229175    8/1999

(Continued)

OTHER PUBLICATIONS

European Patent Office Supplementary search report, European Patent Application No. 04750306.5-2217, issued Sep. 11, 2008.

(Continued)

*Primary Examiner*—Ngoc-Yen T Vu
(74) *Attorney, Agent, or Firm*—Pattric J. Rawlins; Procopio Cory Hargreaves & Savitch LLP

(57) ABSTRACT

Methods and apparatus are provided for computing focus information prior to scanning digital microscope slides with a line scan camera. The methods include a point-focus procedure that works by moving the slide to the desired measurement location, moving the objective lens through a predefined set of height values, acquiring imagery data at each height, and determining the height of maximum contrast. The methods also include a ribbon-focus procedure whereby imagery data are acquired continuously, while the slide and objective lens are in motion. Both methods may be applied with either a static or a dynamic implementation.

21 Claims, 7 Drawing Sheets

U.S. PATENT DOCUMENTS

| | | | |
|---|---|---|---|
| 4,806,015 | A | 2/1989 | Cottingham |
| 4,835,562 | A | 5/1989 | Norita et al. |
| 4,845,552 | A | 7/1989 | Jaggi et al. |
| 4,960,999 | A | 10/1990 | McKean et al. |
| 5,086,477 | A | 2/1992 | Yu et al. |
| 5,097,127 | A | 3/1992 | Hildenbrand et al. |
| 5,185,638 | A | 2/1993 | Conzola |
| 5,187,754 | A | 2/1993 | Currin et al. |
| 5,231,663 | A | 7/1993 | Earl et al. |
| 5,235,167 | A | 8/1993 | Dvorkis et al. |
| 5,400,145 | A | 3/1995 | Suita et al. |
| 5,412,214 | A | 5/1995 | Suzuki et al. |
| 5,416,609 | A | 5/1995 | Matsuda et al. |
| 5,434,629 | A | 7/1995 | Pearson et al. |
| 5,495,535 | A | 2/1996 | Smilansky et al. |
| 5,578,832 | A | 11/1996 | Trulson et al. |
| 5,633,948 | A | 5/1997 | Kegelmeyer, Jr. |
| 5,644,356 | A | 7/1997 | Swinson et al. |
| 5,650,813 | A | 7/1997 | Gliblom et al. |
| 5,672,861 | A | 9/1997 | Fairley et al. |
| 5,710,835 | A | 1/1998 | Bradley |
| 5,714,756 | A | 2/1998 | Park et al. |
| 5,790,710 | A | 8/1998 | Price et al. |
| 5,793,969 | A | 8/1998 | Kamentsky et al. |
| 5,796,861 | A | 8/1998 | Vogt |
| 5,828,446 | A | 10/1998 | Davis |
| 5,834,758 | A | 11/1998 | Trulson et al. |
| 5,872,591 | A | 2/1999 | Truc et al. |
| 5,895,915 | A | 4/1999 | DeWeerd et al. |
| 5,912,699 | A | 6/1999 | Hayenga et al. |
| 5,922,282 | A | 7/1999 | Ledley |
| 5,943,122 | A | 8/1999 | Holmes |
| 5,963,314 | A | 10/1999 | Worster et al. |
| 5,968,731 | A | 10/1999 | Layne et al. |
| 5,991,444 | A | 11/1999 | Burt et al. |
| 5,999,662 | A | 12/1999 | Burt et al. |
| 6,002,789 | A | 12/1999 | Olsztyn et al. |
| 6,005,964 | A | 12/1999 | Reid et al. |
| 6,025,601 | A | 2/2000 | Trulson et al. |
| 6,049,421 | A | 4/2000 | Raz et al. |
| 6,078,681 | A | 6/2000 | Silver |
| 6,091,846 | A | 7/2000 | Lin et al. |
| 6,101,265 | A | 8/2000 | Bacus et al. |
| 6,215,892 | B1 | 4/2001 | Douglass et al. |
| 6,262,838 | B1 | 7/2001 | Montagu |
| 6,272,235 | B1 | 8/2001 | Bacus et al. |
| 6,288,782 | B1 | 9/2001 | Worster et al. |
| 6,327,377 | B1 | 12/2001 | Rutenberg et al. |
| 6,330,348 | B1 | 12/2001 | Kerschmann et al. |
| 6,388,809 | B1 | 5/2002 | MacAulay |
| 6,438,268 | B1 | 8/2002 | Cockshott et al. |
| 6,449,048 | B1 | 9/2002 | Olszak |
| 6,519,357 | B2 | 2/2003 | Takeuchi |
| 6,693,716 | B2 | 2/2004 | Sieckmann |
| 6,711,283 | B1 | 3/2004 | Soenksen |
| 6,714,281 | B1 | 3/2004 | Amano et al. |
| 6,763,140 | B1 | 7/2004 | Skoll |
| 7,155,049 | B2 | 12/2006 | Wetzell et al. |
| 7,247,825 | B2 | 7/2007 | Soenksen et al. |
| 7,248,282 | B2 * | 7/2007 | Maddison .................... 348/79 |
| 7,312,919 | B2 | 12/2007 | Overbeck |
| 7,596,249 | B2 * | 9/2009 | Bacus et al. ................ 382/128 |
| 7,702,181 | B2 * | 4/2010 | Gouch ........................ 382/284 |
| 2001/0012069 | A1 | 8/2001 | Derndinger |
| 2002/0090127 | A1 | 7/2002 | Wetzel et al. |
| 2004/0232321 | A1 | 11/2004 | Miles et al. |
| 2007/0159688 | A1 | 7/2007 | Descour et al. |
| 2007/0187571 | A1 * | 8/2007 | Ebe et al. .................. 250/201.2 |

FOREIGN PATENT DOCUMENTS

| | | |
|---|---|---|
| DE | 10232242 | 2/2004 |
| EP | 0339582 | 4/1989 |
| EP | 0363931 | 4/1990 |
| EP | 0796005 | 9/1997 |
| EP | 0871052 | 10/1998 |
| JP | 4194905 | 7/1992 |
| JP | H05-76005 | 3/1993 |
| JP | H11-211988 | 8/1999 |
| JP | 2001-210263 | 8/2001 |
| JP | 2002-042706 | 2/2002 |
| WO | WO98/20445 | 5/1998 |
| WO | 98/39728 | 9/1998 |
| WO | WO9839728 | 9/1998 |
| WO | 98/4446 | 10/1998 |
| WO | WO98/44333 | 10/1998 |
| WO | WO98/52018 | 11/1998 |
| WO | WO01-84209 | 11/2001 |

OTHER PUBLICATIONS

PCT/ISA/210 International Application No. PCT/US04/11966, International Search Report issued Oct. 13, 2004.

PCT/ISA/237 International Application No. PCT/US04/11966, Written Opinion of the International Searching Authority issued Oct. 13, 2004.

PCT/IPEA/409 International Application No. PCT/US04/11966, International Preliminary Examination Report, Apr. 22, 2005.

EP04750306, EPO Article 94(3) EPC Communication, Jun. 8, 2009.

Hamilton, Eric, "JPEG File Interchange Format" Version 1.02, Sep. 1, 199; C-Cube Microsystem, Milpitas, CA.

Adobe Developers Association, "TIFF" Revision 6.0, Jun. 3, 1992; Adobe Systems Incorporated, Mountain View, CA.

United States Patent and Trademark Office, office action issued Oct. 25, 2007, U.S. Appl. No. 10/827,207.

United States Patent and Trademark Office, office action issued Jul. 21, 2008, U.S. Appl. No. 10/827,207.

Cited reference analyses, obtained from U.S. Patent Office Website from U.S. Appl. No. 95/000,518, dated Nov. 23, 2009, 41 pages.

Greenfield Sluder and David E. Wold eds., Methods in Cell Biology, vol. 56, Chapter 2, (1998).

Hunt, Circumference imaging for optical based identification of cylindrical and conical objects, Feb. 1, 1997.

Cited reference analyses, obtained from U.S. Patent Office Website from U.S. Appl. No. 95/000,516, dated Nov. 23, 2009, 58 pages.

\* cited by examiner

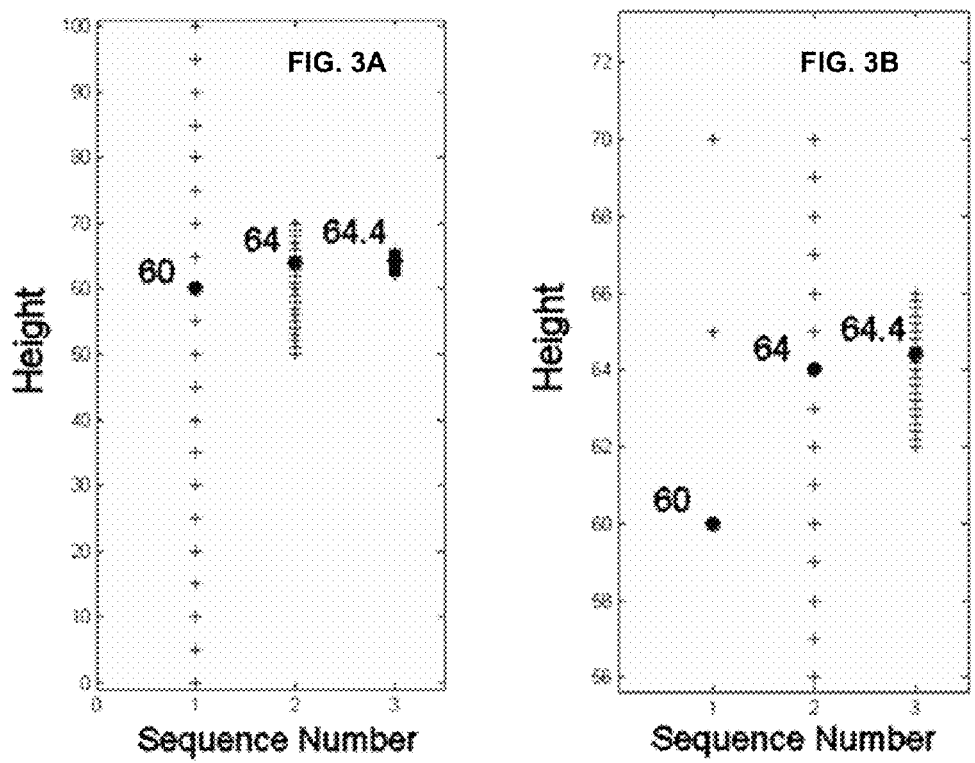
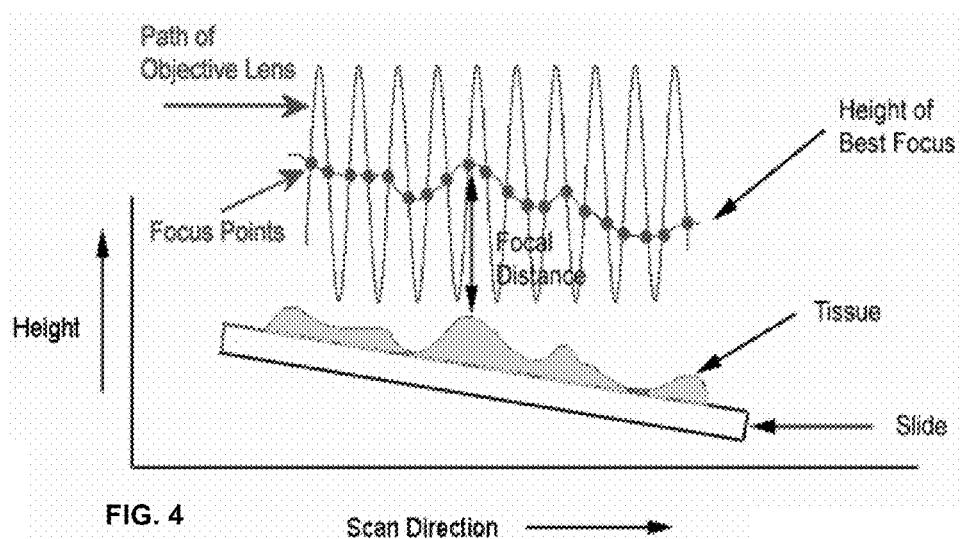

METHOD FOR PRE-FOCUS OF DIGITAL SLIDES

RELATED APPLICATION

The present application is a continuation of application Ser. No. 10/827,207 filed Apr. 16, 2004 that claims priority to U.S. provisional patent application Ser. No. 60/463,909 filed on Apr. 17, 2003, where application Ser. No. 10,827,207 is a continuation-in-part of U.S. Pat. No. 6,917,696 filed on Mar. 11, 2004, which is a continuation of U.S. Pat. No. 6,711,283 filed on May 3, 2000, each of which is incorporated herein by reference in its entirety.

BACKGROUND

1. Field of the Invention

The present invention generally relates to the field of digital microscopy and more particularly relates to the focusing of a line scan camera prior to and during the capture of imagery data from a specimen on a microscope slide.

2. Related Art

In conventional virtual microscopy systems, image tiling techniques produce individual image tiles that can be significantly out of focus over much of the image. An image tiling system is restricted to a single focal distance for each individual snapshot taken by its camera, thus, each of these "fields of view" have areas that are out of focus when the subject specimen being scanned does not have a uniform surface. At the high magnification levels employed in virtual microscopy, specimens with a uniform surface are extremely rare.

Conventional image tiling solutions are severely handicapped by these limitations, with their only recourse being to discard a significant amount of out of focus image data, resulting in an increased number of image tiles that must be scanned and a corresponding increase in the time to scan a microscope slide. Even so, the resulting image data still suffers from out of focus areas on each image tile. The discarding of perimeter image data that is extremely out of focus still leaves out of focus image data in the image tile resulting from the inherent circular optical distortion.

Recently, new line scan camera systems have been introduced to the virtual microscopy industry such as the ScanScope® scanner created by Aperio Technologies, Inc. The revolutionary ScanScope® scanner system does not suffer from circular optical distortion due to its use of a line scan camera. Additionally, the line scan camera can adjust its focus for each line of pixels that are captured when scanning a microscope slide. Thus, the quality of the resulting image from a line scan camera system is significantly better due to the sharp focus of each line of pixels captured by the line scan camera.

Accordingly, these significant advancements in the virtual microscopy industry have created a need for a system and method that overcomes the significant focusing problems inherent in conventional image tiling systems and capitalizes on the focusing capabilities of the revolutionary line scan camera systems.

SUMMARY

Systems and methods are provided for computing focus information prior to scanning microscope slides with a line scan camera based digital microscopy system. In a point-focus procedure, the line scan camera system first positions the slide at a desired measurement location, moves the objective lens through a predefined set of height values and acquires imagery data at each height, and then determines the height (Z-axis setting) of maximum contrast. The maximum contrast height is then established as the optimal focus height. In a ribbon-focus procedure, the line scan camera system acquires imagery data continuously while the slide and objective lens are in motion. The slide moves through the scanning path and the objective lens changes focus height in a sinusoidal fashion. The captured imagery data are analyzed and heights of maximum contrast are determined, which establishes the optimal focus height along the scan path. Both methods may be applied in either a static or a dynamic implementation.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A-3B are graph diagrams illustrating course and fine increments for determining the height profile for a stripe to be scanned according to an embodiment of the present invention;

FIG. 4 is a side view illustrating an example microscope slide and objective lens during the ribbon-focus process according to an embodiment of the present invention;

DETAILED DESCRIPTION

Certain embodiments as disclosed herein provide a method for defining a focal surface corresponding to a specimen on a microscope slide prior to scanning the specimen with the line-scan camera of a virtual microscopy system. For example, one method disclosed herein allows for the line-scan camera to scan imagery data at a plurality of focus points on the specimen, with each focus point being scanned at a plurality of heights of the objective lens. The resulting imagery data are analyzed to determine which frame of imagery data has the greatest contrast. The height of the objective lens having maximum contrast for that focus point location is then established as the focal height for that location on the microscope slide. A focal surface is then computed from a plurality of focal heights. In subsequent scanning of the specimen on the microscope slide, the line scan camera adjusts the height of the objective lens in accordance with the focal surface resulting in a virtual slide image with optimal focus.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

The ScanScope® scanner utilizes a line-scan camera, combined with a motion control system which moves a stage holding the microscope slide at constant velocity. The slide is moved in a direction that is orthogonal to an objective lens that is coupled with a line scan camera. The line scan camera is thus able to acquire fixed-width stripes of imagery data as the slide moves beneath the lens. Very large areas may be scanned by acquiring a number of overlapping stripes, which are subsequently combined into a single composite image (also referred to as a virtual slide). When compared to the conventional image tiling approach, the ScanScope® scanner is both faster and yields superior imaging results, especially with respect to improved focus quality. With proper calibration, it is possible to achieve near-perfect focus along the center of each stripe. The stripe widths are then adjusted to maintain acceptable focus over the entire width, resulting in a composite image that is uniformly well-focused.

Advantageously, certain pre-focus calibration procedures can be performed prior to scanning in order to improve the scanning speed and the overall focus of the resulting virtual slide image. It should be noted that the pre-focus calibration is not the same as certain auto-focus methods, in which the focus height for the objective lens is determined concurrent with the scanning process.

Figure 1:
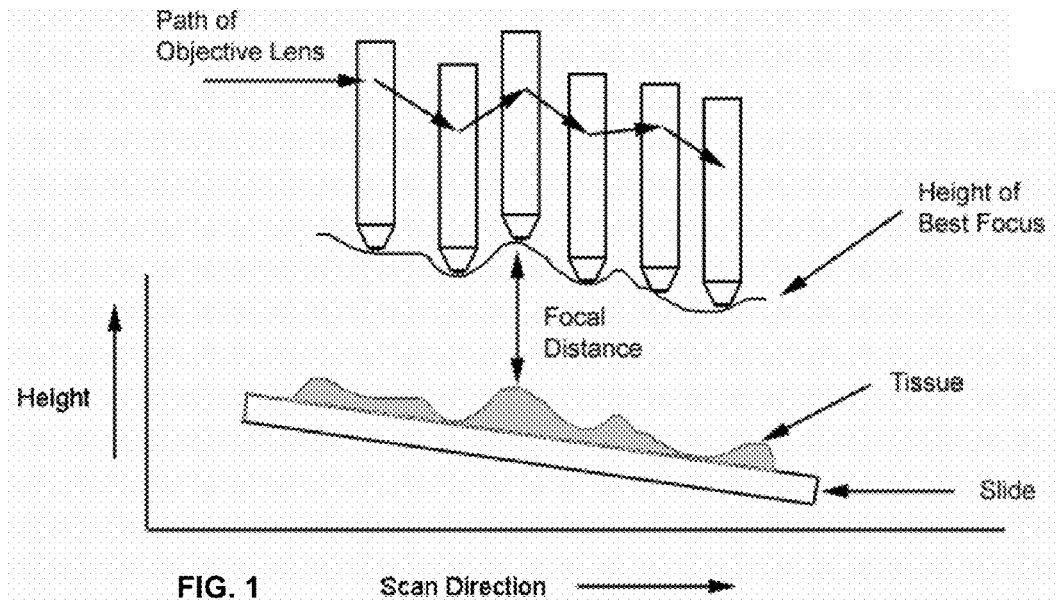
FIG. 1 is a side view illustrating an example microscope slide and objective lens during the slide scanning process according to an embodiment of the present invention.

The pre-focus calibration procedure involves determining the proper height of the objective lens for bringing points on the slide into proper focus (see FIG. 1). The sharpest focus will be obtained along the optical axis, which is aligned with the midpoint of the line scan camera. In general, each point on the slide may require a different focal height to produce the sharpest image possible. Factors affecting focal height include, but are not limited to: tilt and variability of the mechanical motion assembly (e.g., the stage), variations in the thickness of the glass slide and cover slip thickness, variations in specimen (e.g., tissue) thickness, and thermal expansion. All but the first of these variations are different for each slide and require that pre-focus calibration be performed as quickly as possible prior to scanning, so that the calibration data remain accurate during image acquisition.

During the pre-focus calibration, the best-focus lens-height is measured at a fixed number of points ("focus points") on the slide. These point measurements are then used to compute a focal surface, which is used to estimate the height of best-focus everywhere on the slide. During the scanning of a stripe, the height of the objective lens is constrained to follow this pre-determined focal surface (see FIG. 1). As the accuracy of the focal surface improves with the number of pre-focus sample points measured, so does the quality of focus in the scanned imagery data. Provided enough sample points have been taken, each stripe will have near-perfect focus along its midpoint. The width of the stripe is reduced, if necessary, in order to retain only the central portion of the stripe, having best focus quality.

FIG. 1 is a side view illustrating an example microscope slide and objective lens during the slide scanning process according to an embodiment of the present invention. In the illustrated embodiment, the objective lens preferably follows a path that is parallel to the tissue surface in order to maintain a fixed focal distance. During a scan, the objective lens moves up and down to follow the height of best focus. This height profile can be different for each stripe scanned.

There are alternative, yet complementary procedures for fast and accurate focus point measurements. Point-focus and ribbon-focus are two such procedures. Both procedures are based upon the principal that contrast (differences in neighboring pixel intensities) is largest when an image is in focus. Accordingly, imagery data are acquired at different objective-lens heights and analyzed to determine the height where there is maximum contrast. The two procedures differ in how the vertical motion of the objective lens is synchronized with the horizontal motion of the slide during image acquisition.

The point-focus procedure works by moving the slide to the desired measurement location, moving the objective lens through a predefined set of height values, acquiring imagery data at each height, and determining the height of maximum contrast. This stop-and-go process (motion followed by measurement) is repeated for a sequence of predefined focus points. Since motion and image acquisition occur sequentially, the time required for the point-focus procedure is the sum of motion and image acquisition times. In practice, the total time is increased by the lag times associated with starting/stopping both the motion control system and the camera frame-capture. These lag times occur for each height value at every focus point.

In the ribbon-focus procedure, imagery data are acquired continuously, while the slide and objective lens are in motion. There is no waiting for the slide/objective to get to a particular location/height before acquiring imagery data; instead, times of maximum contrast in the imagery data are related to position and height using the prescribed motion profile. Since the ribbon-focus procedure executes motion and image acquisition in parallel the time required will be determined by the slower of these two processes, not their sum. The lag times encountered in the point-focus procedure are also eliminated. These factors make ribbon-focus inherently faster than point-focus for making a large number of focus point measurements.

There are two implementations of these procedures: (1) static; and (2) dynamic. In the static implementation, all focus points for the entire slide (or entire specimen area on the slide) are measured before actual scanning begins. In the dynamic implementation, the focus point measurements are interleaved between stripe scanning. The dynamic implementation minimizes potential drift errors, since focus values are measured as they are needed during the stripe scanning sequence. The dynamic implementation may also make more efficient use of computer resources, since the focusing tasks can be performed in parallel with other scanning tasks.

There are many benefits of the pre-focus calibration procedures. A benefit of the point-focus procedure is that it can be used to focus a select number of optimally placed points. The focusing of each point proceeds independently, without any information about the focus height elsewhere on the slide. This enables focusing to be done where it is needed (e.g., on the specimen) and avoids wasting time on the unused clear area of the slide. Advantageously certain software routines are available to locate the tissue-containing regions on the slide and determine the focus point locations for the point-focus procedure.

In one embodiment, the point-focus procedure can be optimized for sampling the focus height. For example, a coarse height-sampling across a wide vertical range is first used to narrow the range where image data is to be captured and analyzed. Finer increments within the range are then used, with successive narrowing of the range in order to achieve high precision with the fewest number of image acquisitions at different heights for the particular focus point. Current hardware requires approximately 1.0 second per focus point using the optimized point-focus procedure.

The time for the ribbon-focus procedure is approximately 0.1 seconds per focus point. This time is determined by the existing vertical motion control, which is limited to 10 Hz peak-to-peak cycling—faster focusing times are possible with improvements to the vertical positioning system. At this rate, a 15 mm by 15 mm scan area can be sampled at 0.5 mm increments, for a total of 30×30=900 sample points, in 90 seconds (1.5 minutes). This time compares favorably with the scan time of 5 minutes for an area of this size.

The methodology used to generate the focal surface from the list of measured focus points is quite general and able to handle a large number of points at irregularly spaced locations. This is necessary, due to the fact that the locations of specimen material on the slide can be quite irregular. Thus, a uniform distribution of focus points on the slide is unlikely for tissue slides. The ribbon-focus procedure also generates a non-uniform distribution of sample points.

The dynamic implementation reduces the time between focus point measurement and the actual scanning of stripes which depend upon those focus values. Focus points are identified and measured as they are needed for the next stripe to be scanned, minimizing thermal drift effects and allowing accurate focus to be maintained over the entire slide. In addition, the dynamic implementation may not add directly to the overall scan time, since focusing may be done in parallel with other scanning tasks (such as compression and disk input/output), which utilize a different set of hardware resources.

Advantageously, both point-focus and ribbon-focus procedures will work well on various slide types including tissue, cytology, and TMA. For cytology and TMA slides, where large numbers of focus values must be measured in order to capture the variability in focal height, ribbon-focus is the faster and preferred method. When fewer points are needed, such as in a small number of isolated tissue groups, the point-focus method may be faster. When the number of required focus points is not known in advance, the ribbon-focus procedure is preferred, since it can provide the largest number of focus points in the shortest amount of time.

Figure 2:
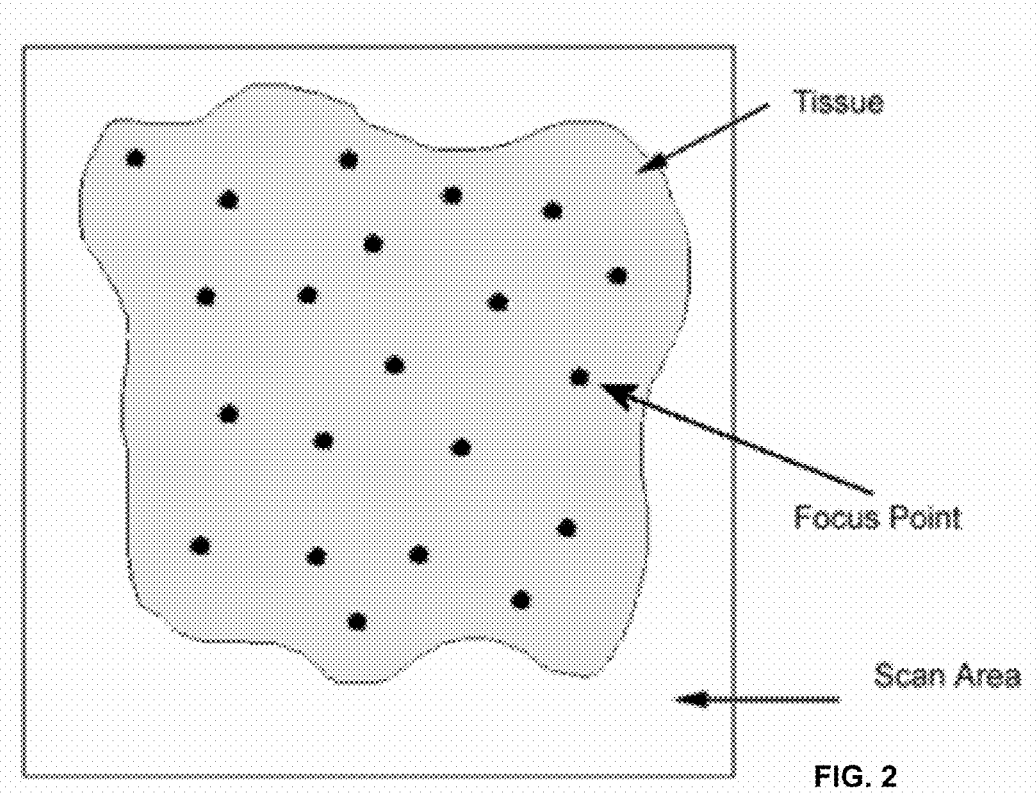
FIG. 2 is a top-view schematic illustrating an example microscope slide having a tissue sample, the area to be scanned, and a plurality of focus point locations according to an embodiment of the present invention.

FIG. 2 is a top-view schematic illustrating an example microscope slide having a tissue sample, the area to be scanned, and a plurality of focus point locations according to an embodiment of the present invention. Before executing the point-focus procedure, the scan area and the locations of potential focus points are determined (see FIG. 2). In one embodiment, the focus points can be identified with a tissue finder procedure that determines, for example, a polygon surrounding the perimeter edge of one or more tissue samples and a plurality of focus points within the tissue sample(s). For tissue slides, the scan area is often a small sub-region of the slide, while for cytology, the scan area may comprise the entire visible slide area. The density and number of focus points can be determined by operational parameters of the tissue finder procedure.

A simple (although not necessarily the fastest) procedure for determining the optimal focal height for a given focus point is as follows:

1. Position the slide by moving it horizontally (x and y) until the objective lens is centered above the point to be focused
2. Position the objective lens at an extreme limit of vertical travel (e.g., the bottom)
3. For each height value
   i. Position objective lens at current height value
   ii. Capture a frame of imagery data
   iii. Calculate contrast at current height
   iv. Increment height value
4. Compare contrast values for all height values Alternatively, the procedure could store the first calculated contrast value and then compare each new contrast value to the stored value and store the new value if it indicated greater contrast. Alternative methods may also be employed, as will be understood by one having skill in the art. Additionally, the frame of imagery date that is captured is advantageously discarded after the contrast value has been calculated.

Typical height sampling is over a range of 100 μm, at increments of 0.20 μm, for a total of 500 height samples per focus point. This approach is very time consuming, since the height sampling is done in discrete steps, each of which requires a finite amount of time for motion to be completed, e.g, 10 seconds per focus point, which is about 20 milliseconds for each height value. Accordingly, decreasing the number of height values at which image data are captured and the contrast value is calculated can increase the efficiency of the overall point-focus procedure.

FIGS. 3A-3B are graph diagrams illustrating course and fine increments for determining the height profile for a stripe to be scanned according to an embodiment of the present invention. A dramatic improvement in execution time can be achieved by an interval refinement procedure, in which coarse increments are used for the initial height sampling, followed by a sampling at finer increments surrounding the point where the highest contrast was found in the previous sampling. The spacing of sample height intervals in the initial course measurement (e.g., in sequence 1) is preferably small enough to ensure that the high-contrast region is not missed altogether. A spacing of 5 μm or less is reasonable for pathology slides using 20× objective lenses. At higher magnification, this spacing may need to be reduced, due to a reduction in the depth of focus.

In FIG. 3A, sequence 1 comprises 20 height samples, at 5 μm increments, over the full 100 μm range. In the illustrated embodiment, the maximum contrast for sequence 1 was found at 60 μm. Accordingly, sequence 2 comprises 20 height samples in the 50-70 μm range. The maximum contrast for sequence 2 was found at 64 μm. Thus, as can be seen in FIG. 3B, sequence 3 comprises 20 height samples in the range 62-66 μm. This last sequence of samples takes place with an interval of 0.20 μm between sample heights. As shown, the maximum contrast for sequence 3 was found at 64.4 μm. Advantageously, the optimal focal height for the particular focus point in this example was identified with only 60 sample heights. A uniform sampling procedure would require 500 sample heights to identify the 64.4 μm maximum contrast height. In one embodiment, the interval approach can be ten times faster than a uniform sampling at 0.20 μm increments over the entire 100 μm height interval.

FIG. 4 is a side view illustrating an example microscope slide and objective lens during the ribbon-focus process according to an embodiment of the present invention. In the ribbon-focus procedure, a stripe of imagery data is collected with the objective lens traveling along an oscillatory height profile as illustrated in the figure. As the lens moves up and down through successive oscillations, it crosses the actual best-focus height a number of times. At each crossing, the imagery data will be in sharp focus and the corresponding contrast value for the frame of imagery data will by high. Thus, the planar location and vertical height values are recorded as a focus point measurement. The hardware motion control must be synchronized with the camera frame readout, so that the location (x,y) and height (z) of the objective lens is known for each frame of imagery data. This synchronization is necessary in order make the connection between high-contrast image frames and focus point coordinates.

The ribbon-focus procedure advantageously yields a set of focus points along the optimal focus path for the stripe. The sample points are not equally spaced, but they are quite regular in the sense that each time the objective lens travels from one extreme of its trajectory to the other, a focus point measurement will result. A possible exception to this is when the trajectory is over clear glass or the specimen contrast is too low to be measured. In such cases, there may be gaps in the sequence of focus points along the optimal focus path.

For the dynamic implementation of the focusing procedure, each stripe is scanned twice. The first scan uses the ribbon-focus procedure for acquiring the focus point values and defining the optimal path of the objective lens, and the second scan follows the optimal path and actually scans the imagery data, resulting in a stripe of well-focused imagery data.

Figure 5:
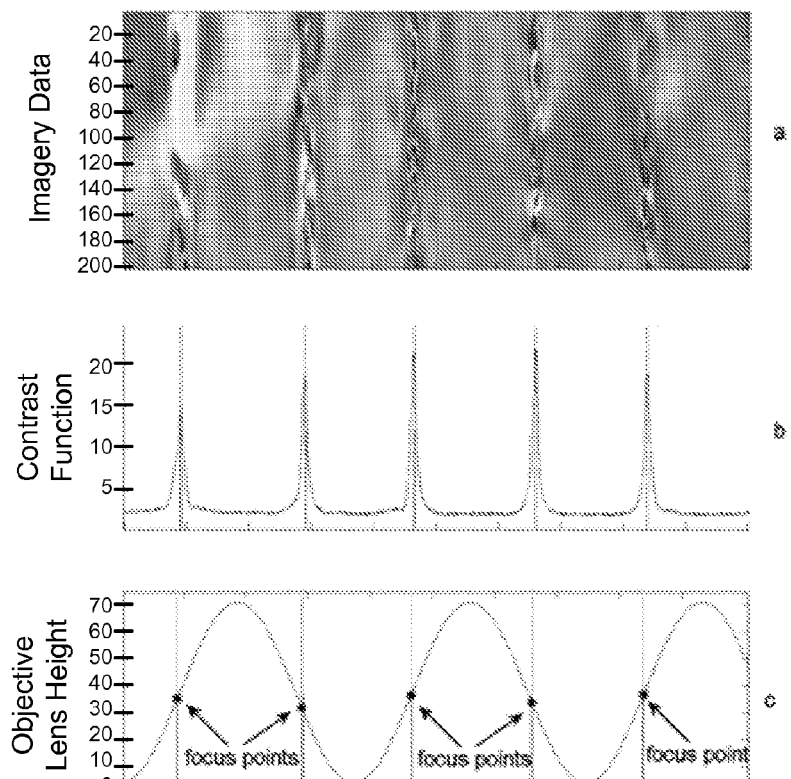
FIG. 5 is a multi-graph diagram illustrating example imagery data and focus point calculations for a microscope slide according to an embodiment of the present invention.

FIG. 5 is a multi-graph diagram illustrating example imagery data and focus point calculations for a microscope slide according to an embodiment of the present invention. In the illustrated embodiment, each vertical line of imagery data (a) corresponds to a particular time, for which the horizontal position and objective lens height are known. As the lens moves up and down (c), the imagery data (a) alternates between blurry and focused. The contrast function (b) is calculated from the imagery data by summing the squared-differences in neighboring pixel values for each frame (column) of imagery data. Advantageously, the contrast function peaks when the imagery data are in focus. A vertical line has been drawn in (b) to note locations of peaks in the contrast function. The same peak locations are shown in (c), where the corresponding lens-height value is noted. Each time the imagery data are in focus, a peak in the contrast function occurs and a focus point measurement is made. A threshold can be set so that only peaks that exceed a certain magnitude will be used as focus points, thereby discarding poor quality measurements.

Although a sinusoidal lens-height function is shown in FIG. 4 and FIG. 5, many other functions are possible, including triangular and saw-tooth functions. The particular function chosen will be determined by matching it to the capabilities of the motion control system. With the ribbon-focus procedure, the rate at which focus points are acquired is limited by the frequency capabilities of the vertical motion control sub-system, the camera frame-rate, and the scanning velocity. The slowest of these components will be the limiting factor in determining the focus point acquisition rate. In one embodiment, a piezo-control used for height-positioning is limited to 10 Hz, which results in 0.10 seconds per focus point.

Figure 6A:
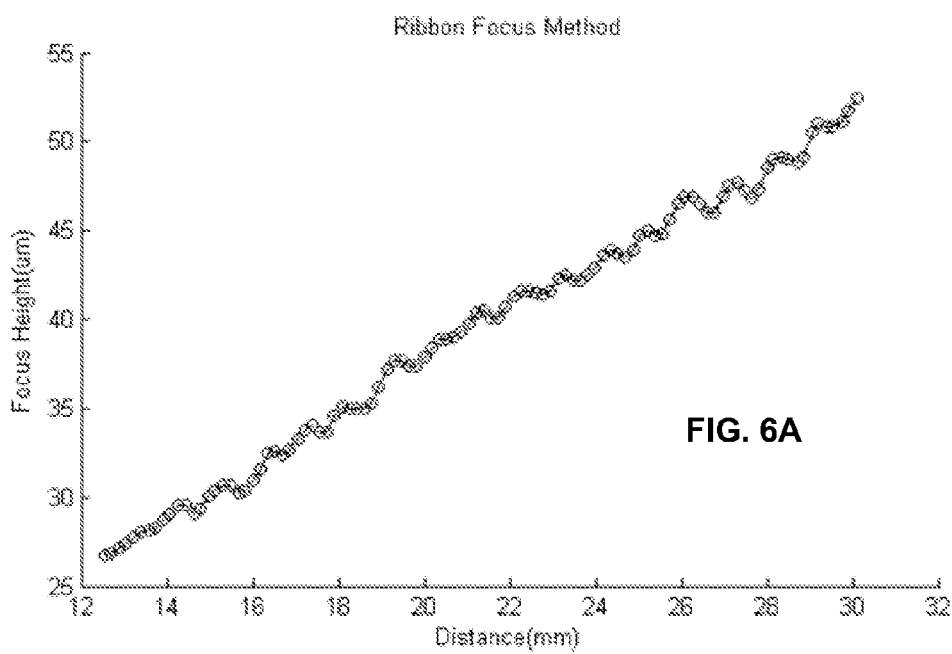
FIGS. 6A-6C are graph diagrams illustrating example focus point measurements from the ribbon-focus procedure and the point-focus procedure according to an embodiment of the present invention.
Figure 6B:
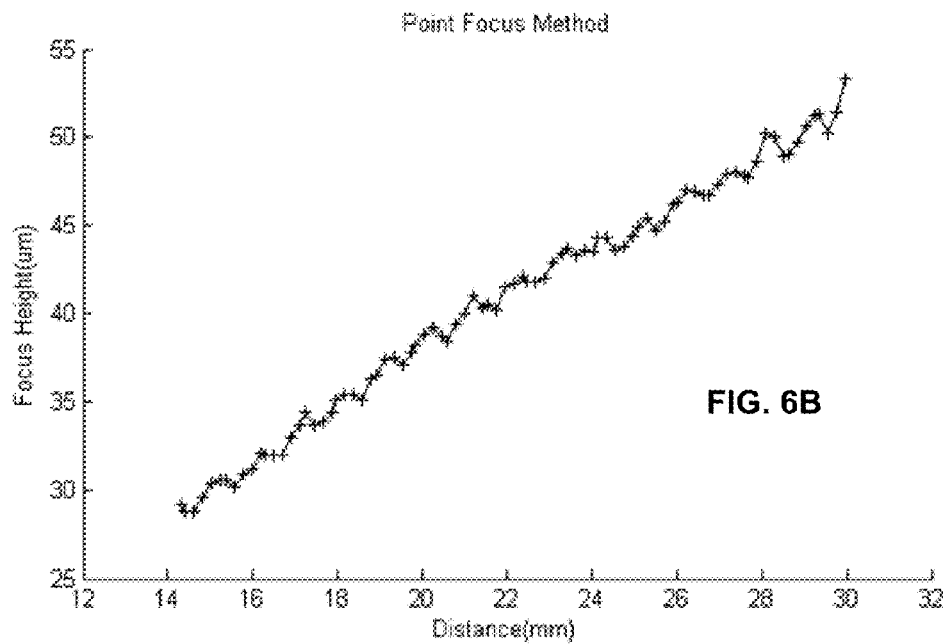
Figure 6C:
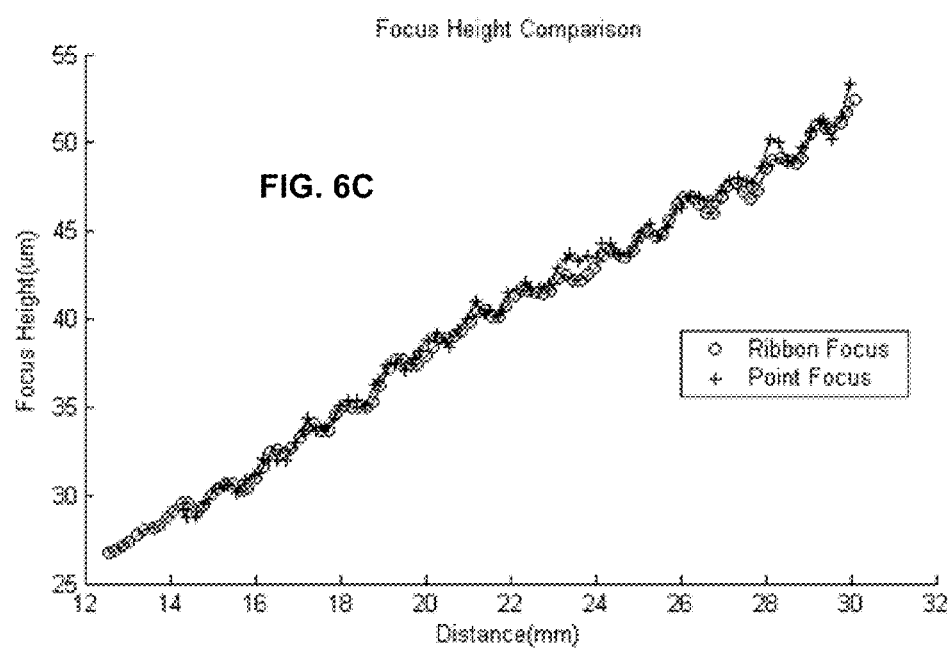

FIGS. 6A-6C are graph diagrams illustrating example focus point measurements from the ribbon-focus procedure and the point-focus procedure according to an embodiment of the present invention. The point-focus and ribbon-focus procedures are alternate methods of making the same measurements. With this in mind, each can be used to confirm the accuracy of the other. The ribbon-focus measurements for the test data shown in FIG. 5 were compared to point-focus measurements on the same slide area. Approximately 100 focus points were measured with each procedure. A graph of the results from the ribbon-focus procedure is shown in FIG. 6A. A graph of the results from the point-focus procedure is shown in FIG. 6B. Both procedures yield nearly identical results, as illustrated in the FIG. 6C graph, which shows the two sets of results in a single graph format.

Figure 7:
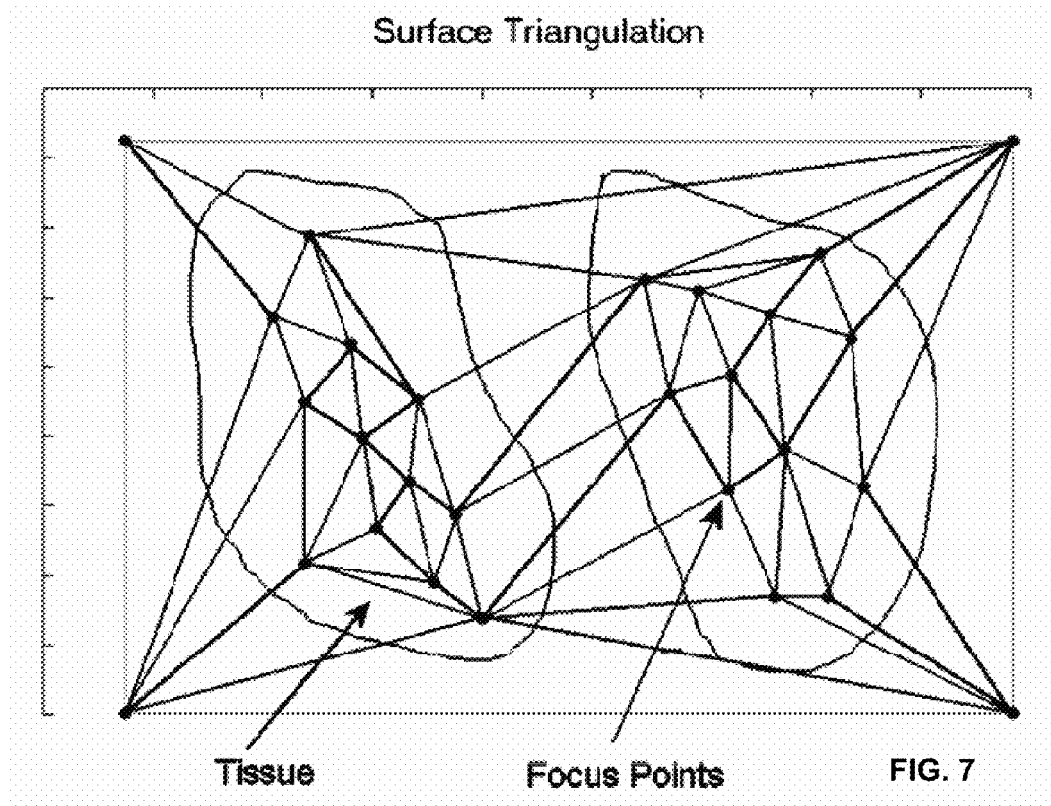
FIG. 7 is a block diagram illustrating an example scan area divided into a plurality triangles according to an embodiment of the present invention.

FIG. 7 is a block diagram illustrating an example scan area divided into a plurality of triangles according to an embodiment of the present invention. When scanning a stripe of imagery data, the objective lens follows a path along the height of best focus. Since the focus height is known only at the focus point locations the focus height elsewhere on the slide is estimated. In the simplest case, when the focus points actually lie on the scan path, the height can be estimated using linear interpolation. For example, the height can be estimated using straight line ramps between the measured height values.

In most cases, a more general two dimensional interpolation method is needed. In one embodiment, the scan area is divided into a set of triangles by connecting each focus point with a pair of neighboring focus points. For example, Delaunay triangulation may advantageously be used to capitalize on the way it generates triangles that have larger interior angles than other triangulation methods.

Figure 8:
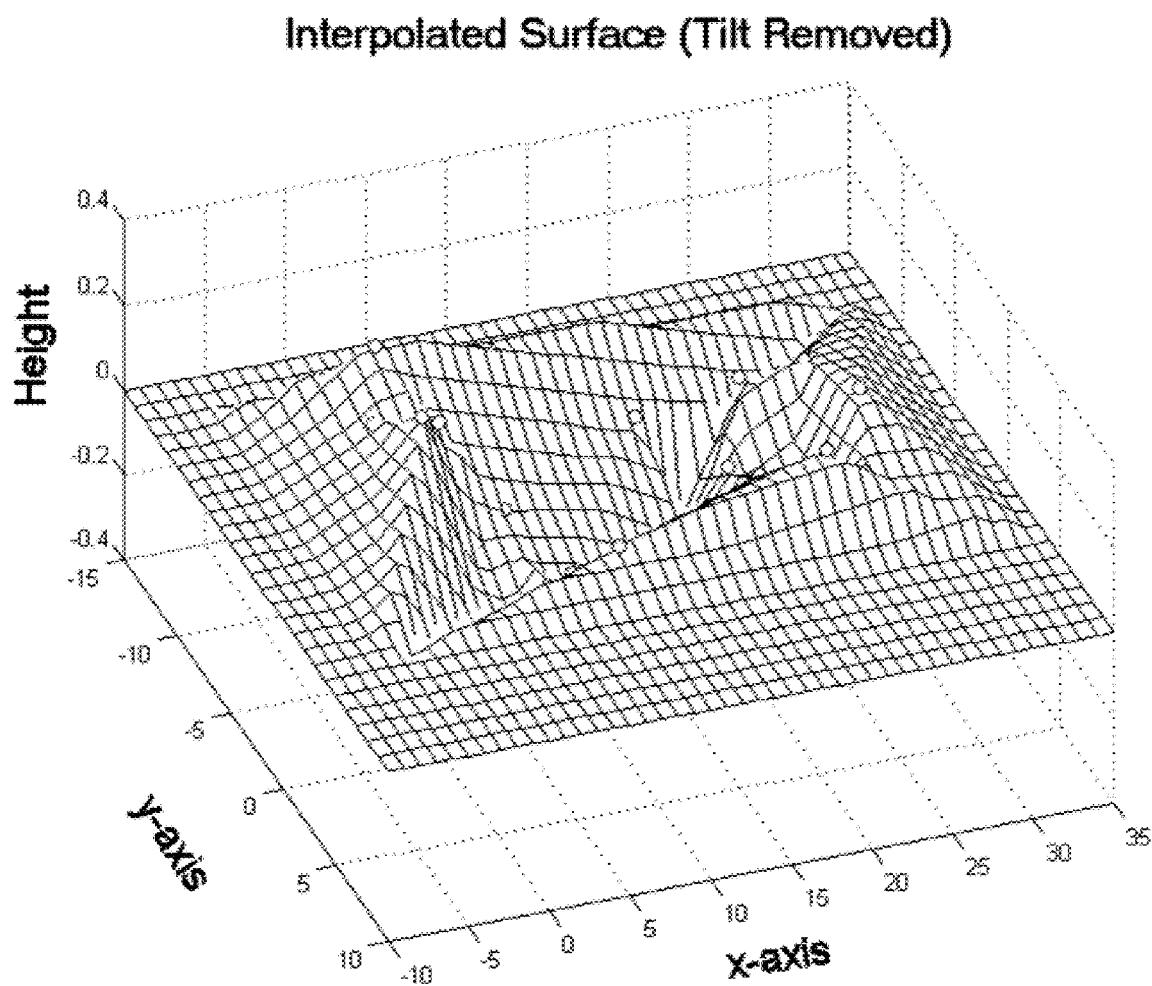
FIG. 8 is a graph diagram illustrating an example focal surface according to an embodiment of the present invention.

To calculate the focus height at a given point on the slide, the triangle enclosing the coordinates for that point is identified. A planar surface connecting the height values for the vertices of that triangle is then constructed. The desired focus height is obtained by projecting the given point onto that planar surface. The focal surface is then a set of planar triangular facets, joined at the height values of the measured focus points, as illustrated in FIG. 8, which is a graph diagram illustrating an example focal surface according to an embodiment of the present invention.

An alternative to interpolation is fitting a functional form to the sampled height measurements. Function-fitting approaches have the undesirable effect that an anomalous height value at one point on the slide can affect the height estimate elsewhere. Additionally, function-fitting requires that the actual form of the height function be known in advance. Inaccurate specification of this functional form will result in height estimation errors. In an embodiment where the measurements of the focus points are known with good precision, interpolation is preferred over function-fitting.

Figure 9:
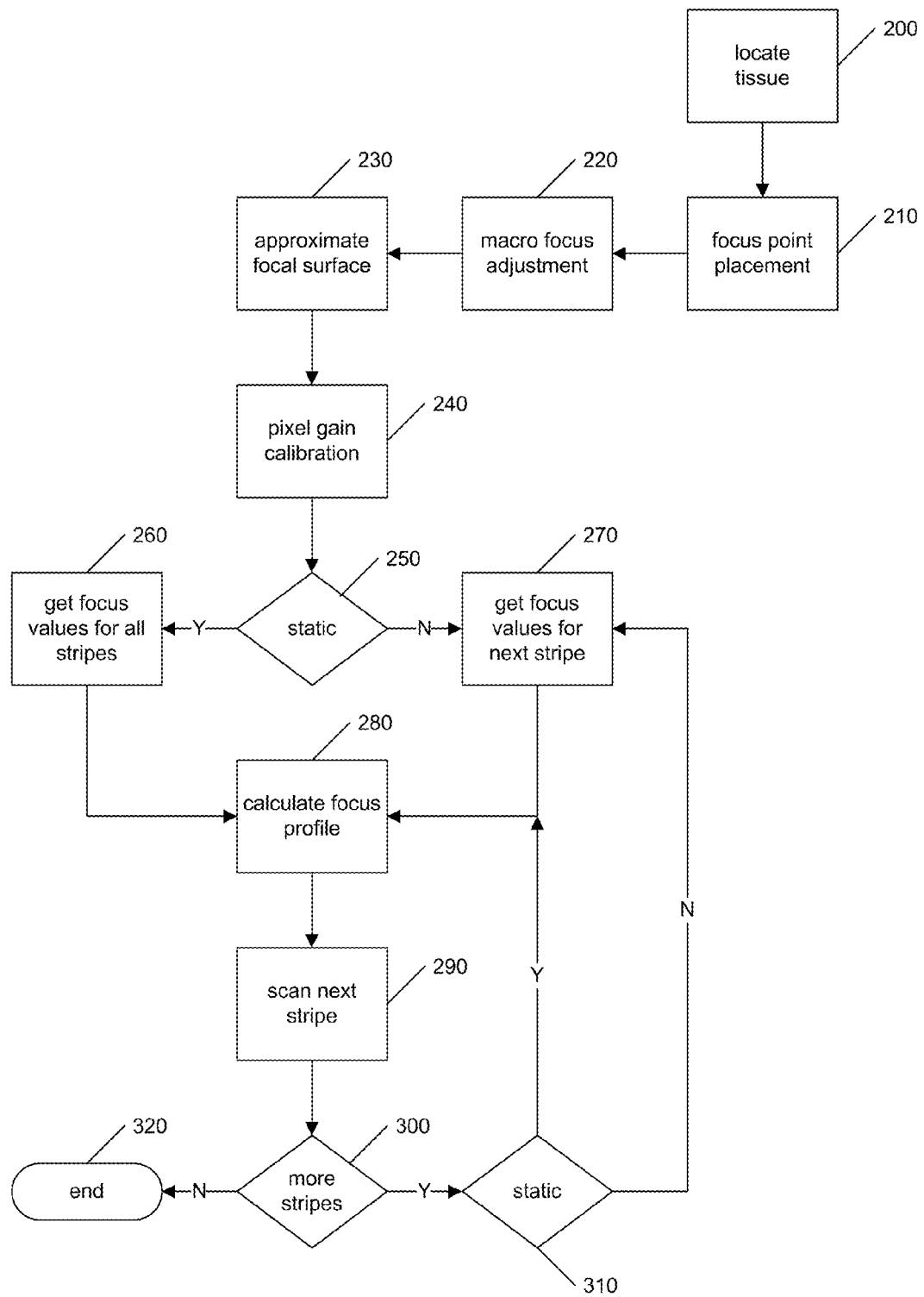
FIG. 9 is a flow diagram illustrating an example process for pre-focus according to an embodiment of the present invention.

FIG. 9 is a flow diagram illustrating an example process for pre-focus according to an embodiment of the present invention. Initially, in step 200, when the slide is first loaded into the line scan camera system, a low-resolution picture is taken of the slide for the purpose of locating the tissue-containing regions. A rectangular area enclosing all tissue regions is calculated, and defines the area to be scanned. For non-tissue slides (cytology), the scan region may include the entire slide. The scan area and focus point placement may also be done manually, or be indicated by a bar-code on the slide label. By limiting the scan area to that part of the slide that contains tissue, overall scan time is reduced. This is a significant benefit to system performance.

Next, in step 210, one or more points are placed on each region for potential focus height sampling. Preferably, these focus points correspond to locations that actually contain tissue, since the pre-focusing process makes use of spatial-contrast detail in the image. The density of focus points within a given tissue region is normally pre-set to a value that yields a practical number of points for the entire scan area. For non-tissue (cytology) slides, the focus points may be distributed uniformly over the scan area.

Next, in step 220, the objective lens is positioned above a focus point and then brought into approximate focus at the center of the area to be scanned. In one embodiment, an operator may be prompted to manually adjust the initial focus. Alternatively, positioning systems can be employed that allow the macro focus adjustment to be done automatically under computer control.

In step 230, an approximation to the focal surface is calculated by passing a plane through three of the previously defined focus points. All possible three-point combinations are considered and the combination that yields the largest-area triangle is chosen for the plane calculation. This method of selection provides points that are widely separated and located at different azimuths from the center of the scan area. The focus height at each of the three points is determined using the point method. An alternative approach is to least-squares fit a plane to the focus values for all focus points. An advantage of using only three points is that it can be done much quicker.

The plane approximation has two main purposes. First, it is used to achieve approximate focus when performing the pixel-gain calibration in step 240. Second, it is used to estimate the nominal focus height during pre-focus. By knowing the approximate focal height, the search range can be narrowed, resulting in faster pre-focusing.

The purpose of the pixel-gain calibration in step 240 is to correct for non-uniformity in optical illumination, as well as variations in pixel sensitivity (fixed pattern noise). In one embodiment, a clear area of the slide (glass and cover slip only) is identified and scanned, resulting in a large number of samples for each camera pixel. These samples are then averaged to yield a single number for each pixel, referred to as the pixel response. Hardware camera gains, integration time, and light-source intensity are all adjusted so that the maximum pixel-response does not exceed 255 counts, the maximum allowable value due to 8-bit A/D conversion. Note that there are red, green, and blue pixels, each having a unique pixel-response value.

The pixel gain is calculated by dividing the number 240 by the pixel response. Pixels near the center of the optical axis (center of the line array) will have a larger pixel sensitivity, since the illumination is brightest at this point. Pixel gain will therefore generally increase away from the center of the array, in order to compensate for this illumination fall-off. Image data are corrected by multiplying each recorded pixel value by the corresponding pixel gain. This correction results in 8-bit image data which is uniformly white in areas containing only glass. Spatial contrast detail in areas containing tissue or other cellular material are then due to true image variation, and the effects of fixed-pattern noise is substantially reduced. This improves the performance of focusing algorithms, which analyze spatial contrast in determining focus height.

An alternative approach to measuring the pixel gain can be performed on non-clear areas of the slide. This is particularly important for cytology slides, in which no clear area may be present. In this approach, the scan direction is parallel to the length of the line-scan detector array (normal scanning is perpendicular to the line array). Except for a small number of values near the beginning and end of the scan, this alternate scanning geometry results in each pixel recording the same sequence of image values. The ends can be trimmed appropriately using cross-correlation techniques to define the extent of the true overlap-region for each pixel. The pixel response is calculated as before, by averaging the trimmed sequence of pixel values for each color channel. Rather than divide the pixel response into 240 as before, it is divided into the average pixel response for the corresponding color channel. An additional calibration is needed to ensure that clear areas of the slide image are white in color.

With the static pre-focus procedure, all focusing is done prior to scanning of the slide. A type of focusing method is chosen as previously described, either ribbon-focus or point-focus. Using the chosen method, the focus height is calculated for a fixed set of sample points on the slide. These focus values are then used as input to the focus profile calculation, prior to scanning the slide.

With the dynamic pre-focus procedure, focusing is interleaved with scanning. As in the static approach, either the ribbon-focus or the point-focus method is used. Prior to scanning a particular stripe, only those sample points that directly affect the focus profile calculation for that stripe are focused. Sample points that have recently been focused for the purpose of scanning a neighboring stripe will not need to be refocused.

Two advantages are gained by the dynamic approach. First, the focusing can be done in parallel with other scanning tasks, such as disk reads and writes. Additionally, underutilized processor and motion control resources can be used without adding significantly to the scan time. Moreover, focus drift is greatly reduced, since the time between focus and acquisition is reduced.

In step 250, the system determines if the static method or the dynamic method is to be employed. If it is the static method, then the system proceeds to get the focus values for all stripes (the entire scan area), as shown in step 260. If it is the dynamic method, then the system proceeds to get the focus values for the next stripe to be scanned, as shown in step 270.

The point-focus method utilizes the set of points resulting from the focus point placement described in step 210. For each focus point, the slide is positioned so that the optical axis, and hence the center of the line scan camera, is centered on that point. The height of the objective lens is adjusted in small steps through a pre-defined range of travel. At each step, a frame of imagery data is collected from the line scan camera and a contrast metric is computed by summing the squared differences between neighboring pixel values. The height having the largest contrast value is taken to be the correct focus height. In order to reduce the number of steps that must be considered, the plane calculated from the approximated focal surface described in step 230 is used to set the mid-point of the range.

In the ribbon-focus method, successive frames of camera data are collected while the slide is in motion, much like a regular scan. During the scan, the objective lens follows an oscillatory height profile, which is synchronized with slide position. At each point in the scan, both the height of the objective lens and its planar position are known, however, the image data at all points will not be in focus. A contrast value is computed for each frame of camera data. The contrast value will peak at those locations along the path of the objective lens where the objective is scanning at the optimal focus height. These peaks are identified and the planar position and height are recorded as a valid focus point.

The exact nature of the oscillatory height profile is not as important as synchronization with slide position. Any number of profiles can be used, including saw-tooth, triangular, and sinusoidal. The sinusoidal profile has the advantage of smooth acceleration and deceleration at motion limits, but is more complex to program. The saw-tooth profile has the advantage of simplicity.

If it is determined in step 250 that static pre-focus is being used, a number of ribbon-focus scans can be done to generate focus point values distributed throughout the scan area. If it is determined in step 250 that dynamic pre-focus is being used, it is preferred to use the trajectory of the next stripe as the path for the ribbon-focus scan. In this way, the focus values will lie exactly on that part of the slide to be scanned next. It is also possible to analyze the contrast value for different segments of the camera pixel array in order to estimate variations in focus height across its width. This additional information can be used to estimate local tilt of the slide and used as input to a mechanical apparatus for tilt compensation.

When collecting a stripe of image data, the objective lens follows a height profile derived from the sampled focus points and calculated into a focus profile, as shown in step 280. The focus profile can be for a single stripe, as in the case of dynamic pre-focus or the focus profile can be for the entire slide (or specimen occupying sub-region thereof). A preferred method for calculating the focus profile is to use interpolation based upon Delaunay triangulation. Accordingly, a surface comprised of a set of triangular facets is generated by connecting each focus point with a pair of neighboring focus points. The benefit of using Delaunay triangulation is that it generates the set of triangles having the smallest mean-squared angular sum. In more simple terms, Delaunay triangulation generates triangular facets that have larger interior angles than other triangulation methods.

To calculate the focus height at a given point on the slide, the triangle enclosing the coordinates for that point is located. A planar surface connecting the height values for the vertices of that triangle is then constructed. The desired focus height is obtained by projecting the given point onto that planar surface. The surface function is then a set of planar triangular facets, joined at the height values of the measured focus points.

Once the focus profile is calculated, in step 290 the line scan system scans the next stripe of image data. If more stripes need to be scanned, as determined in step 300, the system returns to step 270 get the focus point values for the next stripe in the case of dynamic pre-focus (determined in step 310) or returns to calculate the focus profile for the next strip in the case of static pre-focus. Once all of the stripes have been scanned, the process ends, as illustrated in step 320.

Figure 10:
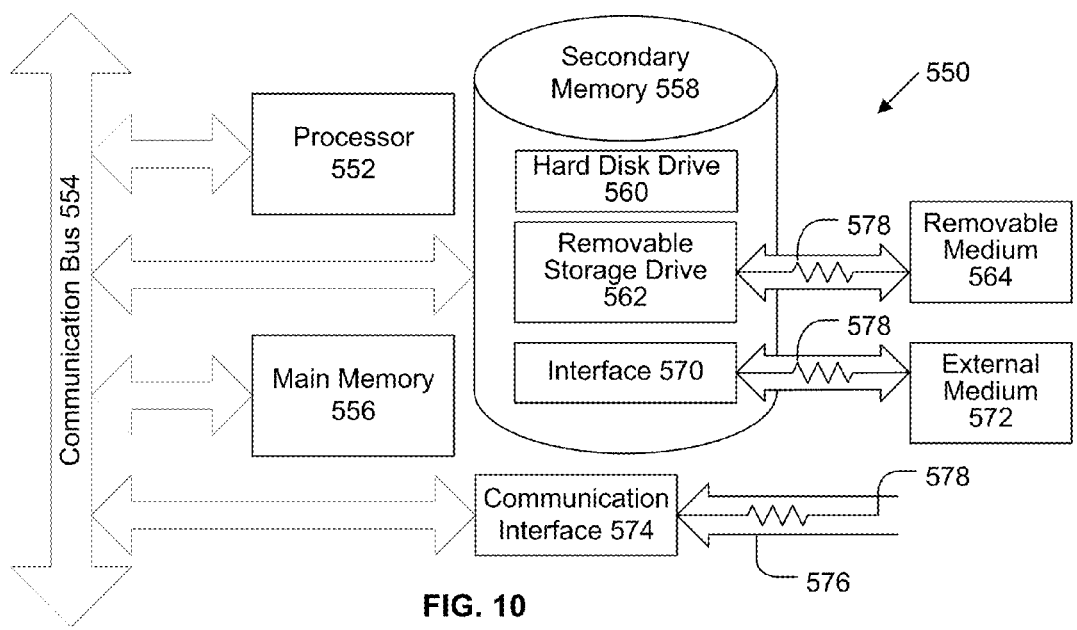
FIG. 10 is a block diagram illustrating an exemplary computer system as may be used in connection with various embodiments described herein.

FIG. 10 is a block diagram illustrating an exemplary computer system 550 that may be used in connection with the various embodiments described herein. For example, the computer system 550 may be used in conjunction with a ScanScope® scanner machine. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/ Internet protocol ("TCP/IP"), serial line Internet protocol/ point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented method for performing pre-scanning calibration in a digital microscopy system having an objective lens coupled to a line scan camera and a stage for supporting a microscope slide, where one or more processors of the digital microscopy system are programmed to perform steps comprising:
    determining a plurality of focus points in a scan area of the microscope slide;
    determining an optimal focal height for each of the plurality of focus points, wherein each focus point comprises a planar location on the microscope slide and a height of the objective lens;
    identifying at least three focus points to define a first polygonal planar surface;
    identifying at least three focus points to define a second polygonal planar surface; and
    combining the first polygonal planar surface and the second polygonal planar surface to create a non-planar focal surface.

2. The method of claim 1, further comprising adjusting the height of the objective lens relative to the stage according to the non-planar focal surface during subsequent scanning of the microscope slide.

3. The method of claim 1, wherein determining an optimal focal height for each of the plurality of focus points comprises moving the objective lens through a predefined set of height values and acquiring imagery data at each height.

4. The method of claim 3, further comprising calculating a contrast value for each height.

5. The method of claim 1, wherein determining an optimal focal height for each of the plurality of focus points comprises moving the objective lens according to a prescribed motion profile.

6. The method of claim 5, wherein the prescribed motion profile is an oscillatory profile.

7. The method of claim 6, wherein the oscillatory profile is selected from the group consisting of sinusoidal, triangular, and saw-tooth profiles.

8. The method of claim 1, wherein the scan area of the microscope slide comprises a linear strip, further comprising scanning an image of the linear strip in accordance with the non-planar focal surface.

9. The method of claim 8, further comprising performing slide illumination correction on the scanned image.

10. The method of claim 9, wherein performing slide illumination correction comprises determining image data from the scanned image and adjusting the image data with a pixel gain value.

11. The method of claim 10, wherein the image data comprises a recorded pixel value and the adjusting comprises multiplying the recorded pixel value by the pixel gain value.

12. The method of claim 1, wherein the first polygonal planar surface is triangular.

13. The method of claim 12, wherein a triangular planar surface is defined using Delaunay triangulation methods.

14. The method of claim 12, wherein the second polygonal planar surface is triangular.

15. A computer implemented method for creating a digital image of a specimen on a microscope slide using a digital microscopy system having an objective lens coupled to a line scan camera and a stage for supporting a microscope slide, where one or more processors of the digital microscopy system are programmed to perform steps comprising:
    determining a scan area of the microscope slide according to a specimen finder procedure, wherein the scan area includes at least a portion of the specimen;
    determining a plurality of focus points in the scan area, wherein a focus point comprises a planar location on the microscope slide and an objective lens height;

creating a plurality of polygonal planar surfaces, wherein each polygonal planar surface comprises a planar surface connecting at least three of the plurality of focus points;

combining the plurality of polygonal planar surfaces to create a non-planar focal surface;

scanning an image of the scan area, wherein the height of the objective lens relative to the microscope slide during said scanning follows the non-planar focal surface; and displaying the image of the scan area as an image of the specimen.

16. The method of claim 15, wherein the scan area of the microscope slide is divided into a plurality of linear strips, further comprising creating a non-planar focal surface for each linear strip.

17. The method of claim 16, further comprising displaying an image of the first linear strip and an image of the second linear strip as a contiguous image of the specimen.

18. The method of claim 15, wherein the scan area of the microscope slide includes the entire specimen, further comprising combining the plurality of polygonal planar surfaces to create a non-planar focal surface of the entire specimen.

19. A system for creating a digital image of a specimen on a microscope slide, comprising:

a stage configured to support a microscope slide having a specimen;

an objective lens;

a motion control system configured to move the stage and continuously adjust the height of the objective lens relative to the stage while the stage is in motion;

a line scan camera coupled with the objective lens, wherein the line scan camera is configured to scan an image of an area of the specimen while the stage is moving;

a processor configured to determine a plurality of focus points in a scan area of the microscope slide, determine an optimal focal height for each of the plurality of focus points, wherein each focus point comprises a planar location on the microscope slide and a height of the objective lens, identify at least three focus points to define a first polygonal planar surface, identify at least three focus points to define a second polygonal planar surface, and combine the first polygonal planar surface and the second polygonal planar surface to create a non-planar focal surface.

20. The system of claim 19, wherein the non-planar focal surface covers a portion of the specimen on the microscope slide.

21. The system of claim 20, wherein the portion of the specimen substantially corresponds to an image stripe.

* * * * *